United States Patent
Lanning et al.

[15] 3,658,129
[45] Apr. 25, 1972

[54] IN SITU GELATION OF POLYMERS DURING WATERFLOODING

[72] Inventors: William C. Lanning; James W. Gall, both of Bartlesville, Okla.

[73] Assignee: Phillips Petroleum Company

[22] Filed: Sept. 1, 1970

[21] Appl. No.: 68,769

[52] U.S. Cl. ............................ 166/270, 166/295, 166/294
[51] Int. Cl. ............................... E21b 33/138, E21b 43/20
[58] Field of Search .................. 166/269, 268, 270, 273, 274, 166/292, 294, 295, 300

[56] References Cited

UNITED STATES PATENTS

| | | | |
|---|---|---|---|
| 3,370,649 | 2/1968 | Wogelmuth | 166/274 |
| 3,378,070 | 4/1968 | Wessler et al. | 166/294 X |
| 3,396,790 | 8/1968 | Eaton | 166/270 |
| 3,400,761 | 9/1968 | Latimer, Jr. et al. | 166/294 X |
| 3,406,754 | 10/1968 | Gogarty | 166/273 |
| 3,502,149 | 3/1970 | Pence, Jr. | 166/295 |
| 3,580,337 | 5/1971 | Gogarty | 166/274 |

*Primary Examiner*—Stephen J. Novosad
*Attorney*—Young and Quigg

[57] ABSTRACT

A method for plugging waterflood zones through the in situ production of gelatinous materials derived from injecting a solution containing a water-soluble bivalent metal salt and a water-soluble polymer of high molecular weight having groups chemically reactive with trivalent metal ions into a waterflood zone followed by the injection of air which converts bivalent metal ions to trivalent metal ions thereby resulting in the aforementioned gelatinous plugging material.

7 Claims, No Drawings

IN SITU GELATION OF POLYMERS DURING WATERFLOODING

This invention relates to the treatment of high permeability strata through which flooding water tends to bypass crude oil in waterflooding operations. In particular, this invention relates to a method for selectively plugging the more permeable waterflow channels of an earth formation. The method of this invention is useful in promoting better control of fluid injection patterns as are desired and the secondary recovery of petroleum by displacement with floodwater.

Since only a portion of the oil contained in a petroleum reservoir can be recovered by primary methods, it has become conventional practice to employ various secondary and tertiary recovery techniques in order to fully exploit the quantities of oil contained in said reservoirs. Of the various secondary and tertiary recovery methods currently available, one of the most widely practiced techniques is the displacement of the oil from the formation by a displacement fluid injected for that purpose, commonly called waterflooding. While waterflooding has been rather widely adopted in recent years, it is not without considerable operating problems and economical limitations. Some of the above problems and difficulties are caused by the aqueous displacing medium channeling and/or fingering through the oil-bearing structure to the producing well, thus bypassing large zones of the oil-bearing strata. While a more uniform flood front with reduced fingering can be obtained with a displacement fluid rendered viscous by the addition of various water-soluble materials, viscous waterflooding alone is not fully effective in all formations.

More uniform flood fronts can be obtained in formations of nonuniform permeability by control or adjustment of the permeability of the more permeable strata of the formation. A number of methods of reducing the permeability of these permeable strata have been proposed, including the injection of plugging materials into the strata which at least partially plug the permeable zone so as to achieve more uniform permeability. Water-soluble polymers are thought of as functioning in one or more of the following ways when utilized in an oil recovery waterflood operation: (1) simple increase in water viscosity, (2) reduced permeability due to polymer absorption on the rock surface, and (3) plugging of pores by quite large polymer molecules or gels of polymer molecules.

The method of our invention provides means of improving performance of waterflood operations by pore plugging. This approach has the advantage that less polymer is required and the method of our invention is not dependent upon the nature of the rock surface for absorption, and sweep efficiencies are not limited by the pseudoplastic nature of the viscous polymer solutions.

The method of our invention injects a solution of a mixture of soluble bivalent metal salt capable of being oxidized and high molecular weight polymer having groups chemically reactive with trivalent metal ions to form a plugging agent. The method of our invention provides said plugging agent for treating high permeability strata through which waterflooding tends to bypass crude oil in waterflooding operations.

The method of our invention is carried out in the absence of air until the calculated time of effective plugging is reached, then air is injected into the same high permeability strata with the air fingering through the said strata and the contained polymer-bivalent metal ion solution causing oxidation thereof to the trivalent form. The oxidation results in precipitation of a gelatinous material thereby reducing further flow of water and forcing the water to displace oil from less permeable zones of the porous reservoirs.

An object of this invention is to provide a method for controlling the permeability of a subterranean formation in waterflooding operations. Another object of this invention is to provide a method for selectively plugging the more permeable water channels of a subterranean formation.

In particular, the method of our invention comprises injecting into an input well penetrating the subterranean, compact, oil-bearing formation, also penetrated by output wells, an aqueous flooding media being substantially free of molecular oxygen and having dissolved therein a water-soluble polymer and a water-soluble bivalent metal salt. The water-soluble polymer consists of a high molecular weight polymer having groups chemically reactive with trivalent metal ions whereupon such a reaction causes gelation or precipitation of an insoluble gel. The aforementioned polymer does not precipitate and is not reactive with bivalent metal ions present in the solution as injected into the well. Air is excluded in the first step of the method of our invention from the solution to avoid or minimize oxidation of the bivalent metal ions. Subsequently, air is injected into the same high permeability strata as the aforementioned waterflood solutions, with the air fingering through the polymer-bivalent metal ion solution therein causing oxidation of the bivalent metal ion to the trivalent form, resulting in precipitation of a gelatinous material which reduces further flow of water through said strata. The reduction of the waterflow through the high permeability strata forces the water to flow through other strata therein displacing oil from less permeable zones of the porous reservoir. Practice of the foregoing method will produce excellent recovery of oil with the employment of a minimum amount of flooding medium additive.

The condition requiring the aqueous flooding media to be substantially free of molecular oxygen is achieved by several methods. A direct and conventional technique is to utilize well water for making up the flooding media. By "well water" is meant any water produced from a subterranean formation. While in the earth, water is normally under reducing conditions and thus, if when brought to the surface, it is maintained in a closed system whereby oxygen is excluded, the oxygen level will be maintained at a satisfactory low level. By whatever technique the waterflood base is deoxygenated it is desirable as hereinbefore described, to maintain the oxygen content from about 0.1 to 4.0 parts per million depending upon the trivalent salt used.

Polymers that can be employed in the invention are water-soluble organic polymers, sometimes referred to as hydrophilic polymeric colloids, characterized by a substantial linearity, and a high molecular weight. The term "water soluble" as employed in the foregoing technology means dispersable in water to provide a visually homogeneous system definitely diluted with water. In the method of our invention a given minimum molecular weight would be arbitrary, especially when used to define the transition point between low polymers and macromolecules. The polymers used in our invention are to be considered as having high molecular weights averaging above about 100,000. Suitable polymers as described hereinabove which may be utilized in the method of our invention are for example, carboxylated cellulose, partly hydrolyzed polyacrylamide, and the like.

The method of our invention provides a flexible method for forming gels, in situ, under ambient conditions. Suitable trivalent metal salts for use in the method of this invention include the trivalent metal salts of acids, e.g., ferric sulfate, ferric chloride, ferric nitrate, chromic chloride, chromic acetate, and the like which are produced from their respective bivalent forms upon contact with oxygen. The amount of metal salt to be used will be a sufficient amount, e.g., for effecting the gelatinous precipitation as described hereinabove. For example, the ratio of a ferrous salt to polymer by weight is from about 1.0 to about 0.006. Circumstances will dictate changes from the above ferrous salt to polymer e.g., when other of the aforementioned salts and mixtures thereof are used as desired.

The method of our invention overcomes the limitation of injecting two or more slugs of different liquids into the formation and expecting fingering or mixing in the formation which may not occur. Air is easily injected and readily mixes and fingers into the formation and formation liquids to convert the bivalent metal ions to trivalent form. The bivalent metal ions have been previously mixed into the polymer at the surface and when converted to trivalent ions reaction occurs in the polymer to produce gels. Clearly, this invention can be extended to cover the use of other bivalent metal salts which can readily be oxidized to trivalent ions for reaction with any polymer to produce gels in waterflooding. The distance at which gels are produced from the well bore can thus be readily controlled by merely determining when to inject air. The polymer-bivalent metal salt solution additive may be injected into the well bore in slugs or in a continuous fashion along with the water of the waterflood.

From the foregoing description, it should be apparent that a new technique for plugging high permeability strata and waterflooding operation has been developed which offers significant advantages over prior art techniques.

What we claim is:

1. An in situ gelation method for waterflood plugging, comprising:
   introducing a solution containing a water-soluble bivalent metal salt and a water-soluble, substantially linear polymer of high molecular weight having groups chemically reactive with trivalent metal ions to a waterflood zone in the absence of air;
   injecting air into the waterflood zone containing the bivalent metal salt and the polymer solution;
   oxidizing the bivalent metal content of said zone to the trivalent form;
   precipitating an insoluble gelatinous form of the reacted trivalent metal ion-polymer contents of said waterflood zone; and
   plugging the high permeability strata of said waterflood zone.

2. The method according to claim 1 wherein the polymer has a molecular weight of at least 100,000 and is selected from at least one of carboxylated cellulose and partly hydrolyzed polyacrylamide.

3. A method according to claim 1 wherein the bivalent metal salt is selected from at least one of ferrous sulfate, ferrous chloride, ferrous nitrate, chromous chloride, chromous nitrate, and chromous acetate.

4. A method according to claim 1 wherein the bivalent metal salt is a ferrous salt and the ratio of ferrous salt to polymer by weight is from about 1.0 to about 0.006.

5. A method according to claim 1 wherein the oxygen content of the solution containing the water-soluble bivalent metal salt and the water-soluble polymer is from about 0.1 to about 4.0 parts per million.

6. A method according to claim 1 wherein the water-soluble bivalent metal salt and water-soluble polymer solution is introduced to the waterflood zone in a continuous method.

7. A method according to claim 1 wherein the water-soluble bivalent metal salt and water-soluble polymer solution is introduced to the waterflood zone through a slug method.

* * * * *